United States Patent
DeLuca et al.

(10) Patent No.: US 11,734,300 B2
(45) Date of Patent: Aug. 22, 2023

(54) ARCHIVAL OF DIGITAL TWIN BASED ON IOT SENSOR ACTIVITY

(71) Applicant: International Business Machines Corporation, Armonk, NY (US)

(72) Inventors: Lisa Seacat DeLuca, Baltimore, MD (US); Joseph G. Berti, Highlands Ranch, CO (US)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 16/575,548

(22) Filed: Sep. 19, 2019

(65) Prior Publication Data

US 2021/0089551 A1 Mar. 25, 2021

(51) Int. Cl.
*G06F 16/27* (2019.01)
*H04L 9/06* (2006.01)
*G06F 21/64* (2013.01)
*G06Q 30/018* (2023.01)
*H04L 9/00* (2022.01)

(52) U.S. Cl.
CPC ............ *G06F 16/27* (2019.01); *G06F 21/645* (2013.01); *G06Q 30/018* (2013.01); *H04L 9/0637* (2013.01); *H04L 9/50* (2022.05)

(58) Field of Classification Search
CPC ..... G06F 16/27; G06F 21/645; G06Q 30/018; H04L 9/0637; H04L 2209/38
USPC ........................................................ 707/634
See application file for complete search history.

(56) References Cited

U.S. PATENT DOCUMENTS

| | | |
|---|---|---|
| 8,514,082 B2 | 8/2013 | Cova |
| 9,614,899 B1 | 4/2017 | Rukonic et al. |
| 10,234,853 B2 | 3/2019 | Mukkamala et al. |
| 10,659,919 B1* | 5/2020 | Li ........................... G01S 5/0244 |
| 10,798,175 B1* | 10/2020 | Knight .................... H04L 67/12 |
| 2012/0143516 A1* | 6/2012 | Mezic .................... G01R 19/00 |
| | | 702/24 |
| 2017/0020461 A1* | 1/2017 | Quinn ...................... A61B 5/11 |
| 2017/0129254 A1* | 5/2017 | Nardiello ............... G06Q 10/00 |
| 2017/0208151 A1* | 7/2017 | Gil ....................... H04L 67/1097 |
| 2018/0046173 A1* | 2/2018 | Ahmed ................ G05B 13/026 |
| 2019/0033799 A1* | 1/2019 | Billings ................. G06N 20/00 |
| 2019/0158270 A1 | 5/2019 | Berti |
| 2019/0158309 A1* | 5/2019 | Park ..................... H04L 12/2827 |
| 2019/0171187 A1* | 6/2019 | Cella ....................... G06N 3/086 |
| 2019/0208018 A1* | 7/2019 | Scanlin .................... F24F 11/63 |
| 2020/0106633 A1* | 4/2020 | Park ..................... H04L 12/2823 |
| 2020/0124466 A1* | 4/2020 | Lubas ....................... G01J 1/06 |

(Continued)

OTHER PUBLICATIONS

"Modelling, Simulation & Optimization in a Data rich Environment", A window of opportunity to boost innovations in Europe, EU MATHS IN, printed on Jul. 26, 2019, 44 pages.

(Continued)

*Primary Examiner* — Hosain T Alam
*Assistant Examiner* — Nicholas E Allen
(74) *Attorney, Agent, or Firm* — Stephanie L. Carusillo

(57) ABSTRACT

In an approach to archive a digital twin in response to a determination to decommission its associated physical asset, a processor monitors for data sent from an Internet of Things (IoT) sensor associated in the physical asset. A processor determines that a pre-configured threshold is met. A processor reviews a digital twin agreement for the digital twin. A processor archives the digital twin.

17 Claims, 3 Drawing Sheets

(56) References Cited

U.S. PATENT DOCUMENTS

2020/0310394 A1* 10/2020 Wouhaybi ................. G06F 8/65
2020/0379140 A1* 12/2020 Kostrun ............. G05B 19/0425

OTHER PUBLICATIONS

"Refining a Set of Keywords Utilizing Historical Activity Thresholds", An IP.com Prior Art Database Technical Disclosure, IP.com No. IPCOM000219173D, IP.com Electronic Publication Date: Jun. 25, 2012, 20 pages.

Disclosed Anonymously, "Realtime Social and Collaborative Status Updates based on IoT Sensor Data", An IP.com Prior Art Database Technical Disclosure, IP.com No. IPCOM000256346D, IP.com Electronic Publication Date: Nov. 20, 2018, 4 pages.

Madni et al., "Leveraging Digital Twin Technology in Model-Based Systems Engineering", Systems 2019, MDPI, Published: Jan. 30, 2019, 13 pages.

Santos et al., "Adaptive Learning Model for Application-Based Trust and Risk Scoring Using Consistent Profile Creation", An IP.com Prior Art Database Technical Disclosure, IP.com No. IPCOM000248565D, IP.com Electronic Publication Date: Dec. 19, 2016, 7 pages.

* cited by examiner

ARCHIVAL OF DIGITAL TWIN BASED ON IOT SENSOR ACTIVITY

BACKGROUND

The present invention relates generally to the field of digital twins, and more particularly to the archival of a digital twin in response to a determination to decommission its associated physical asset.

A digital twin is a virtual representation of a physical product, process, or system (hereinafter "physical asset") across its life-cycle. A digital twin integrates Internet of Things (IoT), Artificial Intelligence (AI), machine learning, and software analytics with spatial network graphs to create a virtual representation of a physical asset. With the virtual representation of the physical asset, real users can build digital threads, connect disparate systems, refine assumption with predictive analytics, troubleshoot failing equipment, and ultimately optimize the physical asset that it represents in real time.

SUMMARY

Aspects of an embodiment of the present invention disclose a method, a computer program product, and computer system for the archival of a digital twin in response to a determination to decommission its associated physical asset. A processor monitors for data sent from an Internet of Things (IoT) sensor associated in the physical asset. A processor determines that a pre-configured threshold is met. A processor reviews a digital twin agreement for the digital twin. A processor archives the digital twin.

DETAILED DESCRIPTION

Embodiments of the present invention recognize that a digital twin is created of a physical asset. The digital twin that is created is capable of learning, reasoning, updating, and changing as its physical counterpart changes. Embodiments of the present invention further recognize that IoT sensors can be embedded in and/or associated with the physical asset to collect usable data from the surrounding environment of the physical asset and/or the physical asset itself.

Embodiments of the present invention recognize that if there have been no IoT sensor readings for a certain period of time, some pre-configured threshold, the physical asset should probably be decommissioned, and the digital twin associated with the physical asset should be archived. If not, operational issues could arise. For example, a digital twin with a lifecycle that extends well beyond the life span of the proprietary design software that was used to create it could be at a high risk of being unreadable at some point in its service life. Additionally, a digital twin with a long lifecycle will evolve and accumulate historical data over time, ultimately running the risk of becoming increasingly locked into a certain vendor with certain authoring tools.

Embodiments of the present invention provide a system that monitors for data from an IoT sensor embedded in and/or associated with a physical asset. Embodiments of the present invention provide conditions for when a threshold for decommissioning the physical asset has been met. Embodiments of the present invention further provide a method to archive the digital twin associated with the physical asset by destroying it, by moving it to a state that is most cost effective, or by transferring it to a "digital twin junk yard" or to a third party that offers archival services.

The present invention will now be described in detail with reference to the Figures.

Figure 1:
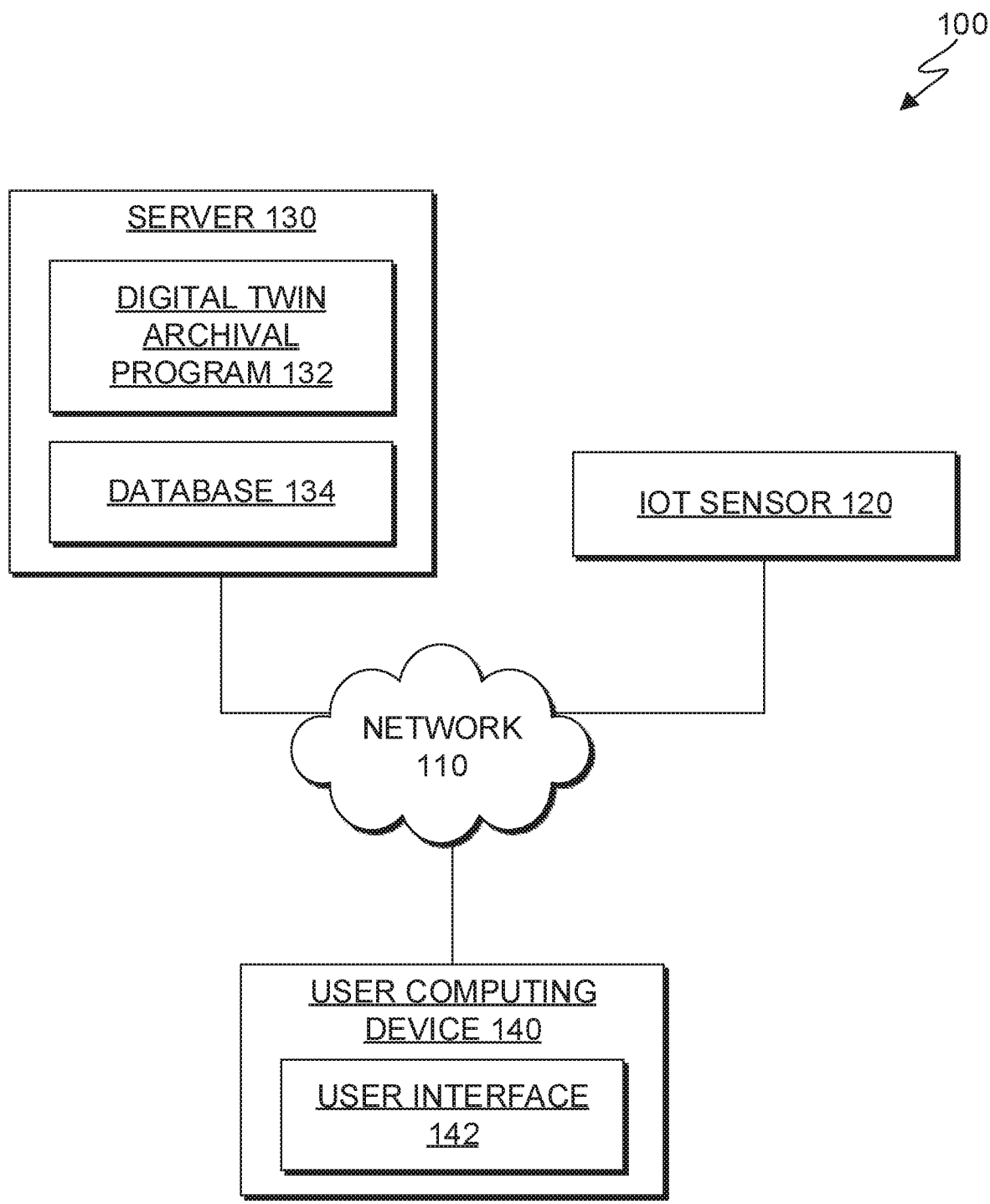
FIG. 1 is a functional block diagram illustrating an IoT sensor activity environment, in accordance with an embodiment of the present invention.

FIG. 1 is a functional block diagram illustrating IoT sensor activity environment 100, in accordance with an embodiment of the present invention. FIG. 1 provides only an illustration of one embodiment of the present invention and does not imply any limitations with regard to the environments in which different embodiments may be implemented. In the depicted embodiment, IoT sensor activity environment 100 includes IoT sensor 120, server 130, and user computing device 140 interconnected over network 110. IoT sensor activity environment 100 may include additional computing devices, servers, computers, or other devices not shown.

Network 110 operates as computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between IoT sensor 120, server 130, and user computing device 140.

IoT sensor 120 is associated with a physical asset and operates to collect and send asset data. In an embodiment, IoT sensor 120 operates to collect data from the physical asset. In general, IoT sensors can be embedded in or associated with physical assets, i.e., automobiles, aircrafts, railcars, industrial equipment, commercial buildings, industrial facilities, smart locks, garage doors, refrigerators, freezers, ovens, A/C units, washer/dryer units, mobile devices, smart watches, smart TVs, virtual assistance devices, surveillance cameras, and any other assets or devices. In general, IoT sensors can collect data from the physical asset including, but not limited to, automation data, status data, and location data. In an embodiment, IoT sensor 120 sends the data collected from the physical asset to digital twin archival program 132, which determines whether to archive a digital twin associated with the physical asset based, at least in part, on the data collected. In an embodiment, IoT sensor activity environment 100 contains IoT sensor 120. In other embodiments, IoT sensor activity environment 100 contains additional IoT sensors (not shown).

Server 130 operates to run digital twin archival program 132 and to send and/or store data in database 134. In an embodiment, server 130 can send data from database 134 to user computing device 140. In an embodiment, server 130 can receive data in database 134 from IoT sensor 120 and from user computing device 140. In some embodiments, server 130 may be a management server, a web server, or any other electronic device or computing system capable of receiving and sending data. In some embodiments, server 130 may be a laptop computer, a tablet computer, a netbook computer, a personal computer (PC), a desktop computer, a smart phone, or any programmable electronic device capable of communicating with IoT sensor 120 and user computer device 140 via network 110. In other embodiments, server 130 represents a server computing system utilizing multiple computers as a server system, such as in a cloud computing environment. Server 130 may include components as described in further detail in FIG. 3.

Digital twin archival program 132 operates to archive a digital twin associated with a physical asset in response to a threshold for decommissioning being met. In an embodiment, digital twin archival program 132 monitors for data collected by IoT sensor 120 associated with the physical asset. In an embodiment, digital twin archival program 132 determines whether a threshold for decommissioning has been met. In an embodiment, digital twin archival program 132 reviews a digital twin agreement. In an embodiment, digital twin archival program 132 determines whether approval is required from a set of parties. In an embodiment, digital twin archival program 132 sends an approval request to the set of parties. In an embodiment, digital twin archival program 132 receives approval from the set of parties. In an embodiment, digital twin archival program 132 archives the digital twin associated with the physical asset. In the depicted embodiment, digital twin archival program 132 resides on server 130. In other embodiments, digital twin archival program 132 may reside on user computing device 140, or another computing device (not shown), provided that digital twin archival program 132 has access to network 110.

A digital twin agreement is a computerized management system for physical assets using digital twins. A digital twin agreement maintains a computer database of information about a physical asset's operations. This information includes, but is not limited to, equipment data management, preventive maintenance, labor, work order system, scheduling, planning, vendor management, inventory control, purchasing, budgeting, and asset tracking. In the case of a digital twin, this information may also include how the digital twin is created, changed, or discarded over its lifetime. This information is intended to help workers do their jobs more efficiently. For example, this information can be used to determine which machines require maintenance and which storerooms contain the spare parts needed. This information is also intended to help management make informed decisions. For example, this information can be used to calculate the cost of repairing a broken machine versus the cost of performing preventive maintenance on each machine.

At a basic level, a digital twin agreement is a program that runs as designated by parties to the contract (or those facilitating computerized digital twin agreement development and execution). The data and programming instructions of the digital twin agreement are stored on a tangible storage device, often as part of a blockchain. The data and programming instructions are processed and executed when predetermined terms and conditions are met. These predetermined terms and conditions are defined, in part, in the digital twin agreement itself as stored on a blockchain.

A blockchain is a shared, distributed ledger stored on tangible storage devices or media on which transactions are digitally recorded and linked together so that they provide the entire history or provenance of a digitally represented physical asset. In the case of a digital twin, attributes of the digital twin and changes to them over time, may be stored on a blockchain.

Database 134 operates as a repository for data captured by an IoT sensor, such as IoT sensor 120. Database 134 can be implemented with any type of storage device capable of storing data and configuration files that can be accessed and utilized by server 130, such as a database server, a hard disk drive, or a flash memory. In an embodiment, database 134 is accessed by IoT sensor 120, server 130, and/or user computing device 140 to store and/or to access the data. In the depicted embodiment, database 134 resides on server 130. In another embodiment, database 134 may reside elsewhere within IoT sensor activity environment 100, provided that database 134 has access to network 110.

User computing device 140 operates to run user interface 142 through which a user can approve of the archival of the digital twin associated with the physical asset. In an embodiment, user computing device 140 receives a request from digital twin archival program 132 via network 110 to approve of the archival of the digital twin associated with the physical asset. In some embodiments, user computing device 140 may be, but is not limited to, an electronic device, such as a laptop computer, a tablet computer, a netbook computer, a personal computer (PC), a desktop computer, a smart phone, or any programmable electronic device capable of running user interface 142 and communicating (i.e., sending and receiving data) with server 130 and digital twin archival program 132 via network 110. In some embodiments, user computing device 140 represents one or more programmable electronic devices or combination of programmable electronic devices capable of executing machine readable program instructions and communicating with IoT sensor 120, server 130, and/or other computing devices (not shown) within IoT sensor activity environment 100 via a network, such as network 110. In an embodiment, user computing device 140 represents one or more devices associated with a user. In the depicted embodiment, user computing device 140 includes an instance of user interface 142. User computing device 140 may include components as described in further detail in FIG. 3.

User interface 142 operates as a local user interface on user computing device 140 through which a user can configure a threshold for decommissioning a physical asset and can approve of the archival of the digital twin associated with the physical asset. In some embodiments, user interface 142 is a graphical user interface (GUI), a web user interface (WUI), and/or a voice user interface (VUI) that can display (i.e., visually) or present (i.e., audibly) alerts including information (such as graphics, text, and/or sound) sent from digital twin archival program 132 to a user via network 110. In an embodiment, user interface 142 enables a user to configure a threshold for decommissioning a physical asset (i.e., length of time, length of dormancy, and/or location of the physical asset) for which digital twin detection and alert program 122 uses in decision 220, which is described later with reference to FIG. 2. In an embodiment, user interface 142 is capable of sending and receiving data (i.e., to and from digital twin archival program 132 via network 110, respectively). For example, user interface 142 enables a user to approve of the archival of the digital twin associated with the physical asset.

Figure 2:
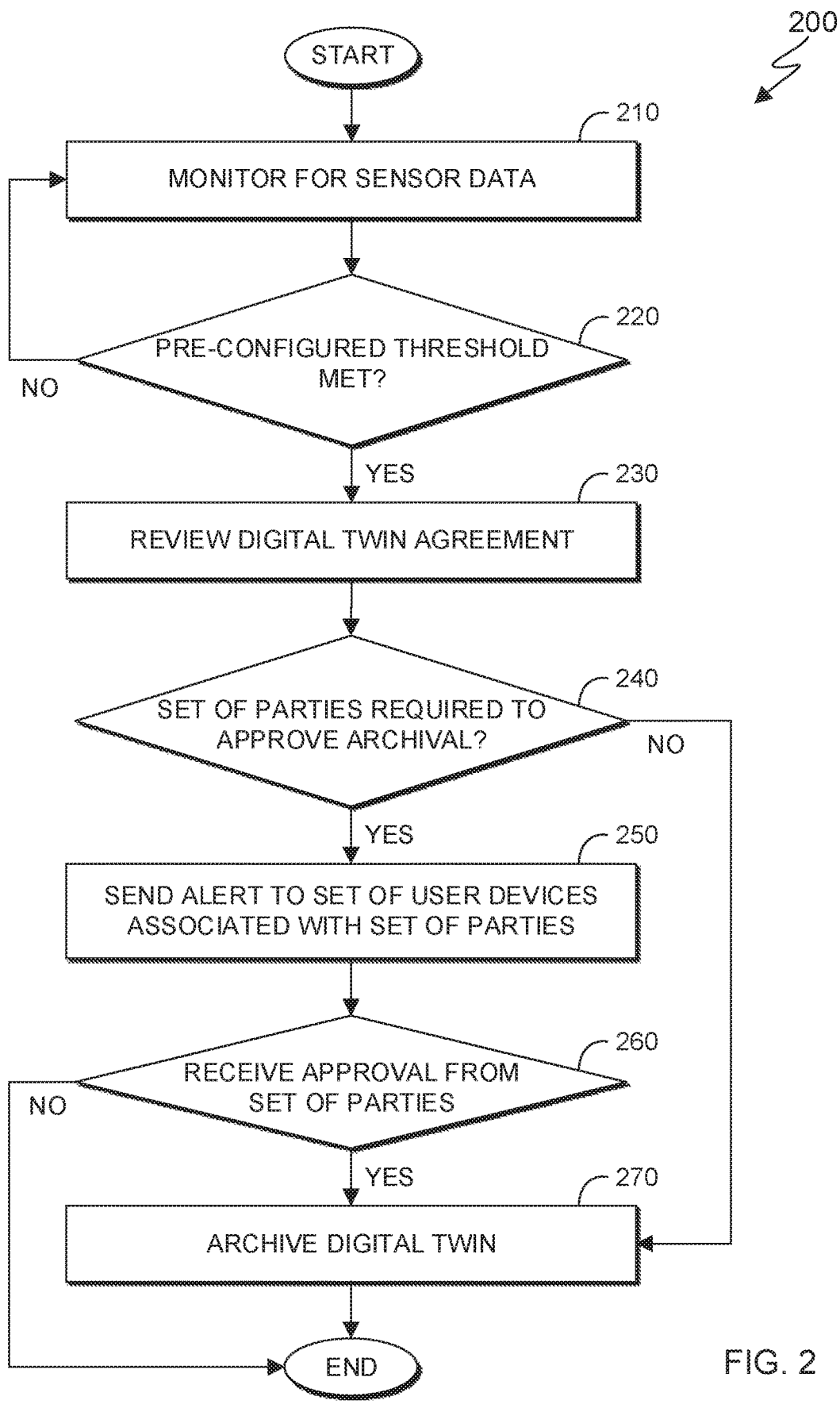
FIG. 2 is a flowchart depicting the steps for a digital twin archival program in an IoT sensor activity environment, such as the one depicted in FIG. 1, in accordance with an embodiment of the present invention.
Figure 3:
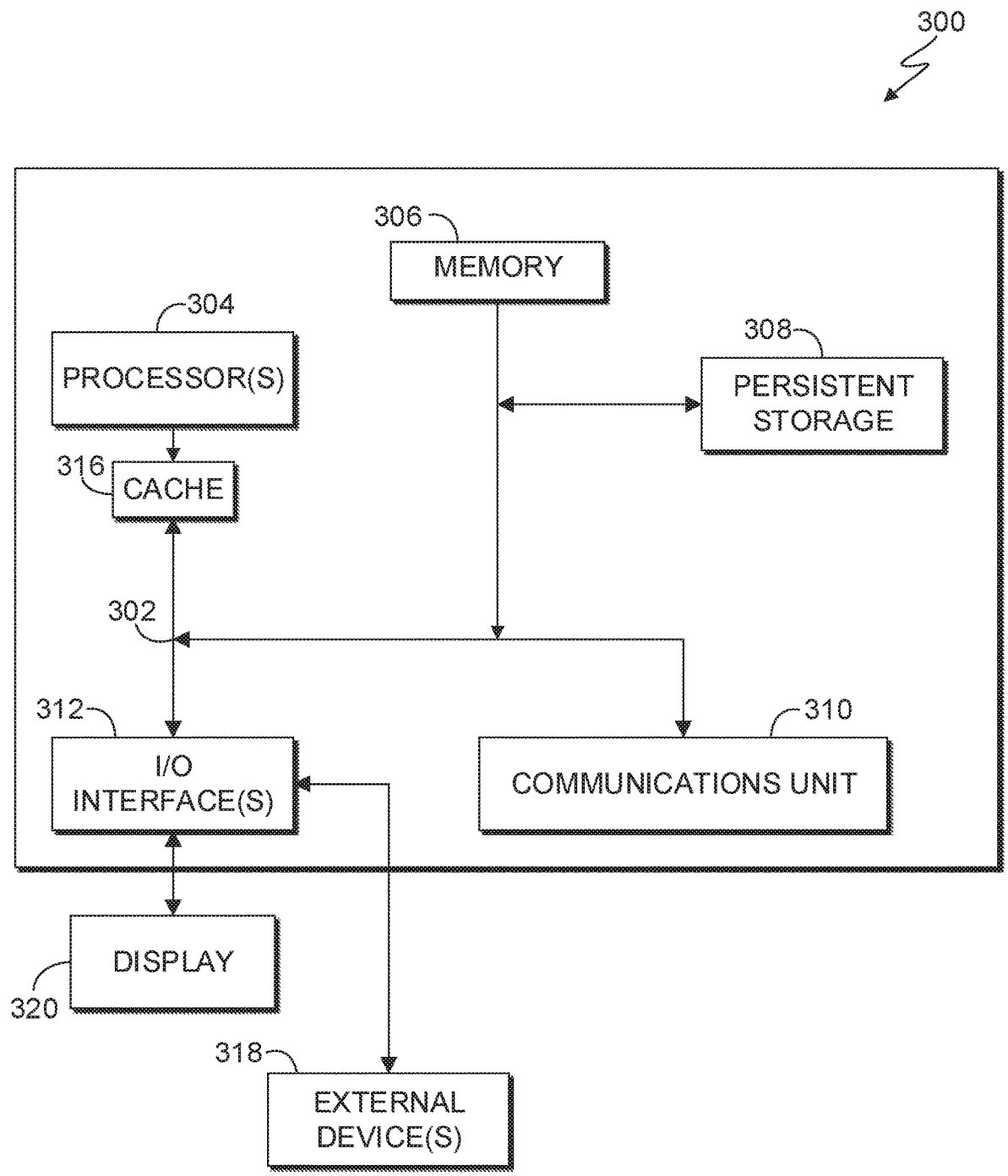
FIG. 3 depicts a block diagram of components of a computing device executing the digital twin archival program, in accordance with an embodiment of the present invention.

FIG. 2 is flowchart 200 depicting the steps for digital twin archival program 132 in an IoT sensor activity environment, such as the one depicted in FIG. 1, in accordance with an embodiment of the present invention. In an embodiment, digital twin archival program 132 monitors for data from an IoT sensor associated with a physical asset. In an embodiment, digital twin archival program 132 determines whether a decommissioning threshold is met. In an embodiment, digital twin archival program 132 reviews a digital twin agreement. In an embodiment, digital twin archival program 132 determines whether approval is required from a set of parties. In an embodiment, digital twin archival program 132 sends an alert. In an embodiment, digital twin archival program 132 receives approval from the set of parties. In an embodiment, digital twin archival program 132 archives the digital twin associated with the physical asset. It should be appreciated that the process depicted in FIG. 3 illustrates one possible iteration of the process flow.

In step 210, digital twin archival program 132 monitors for data. In an embodiment, digital twin archival program 132 monitors for data collected by IoT sensor 120 which is embedded in and/or associated with the physical asset. In an embodiment, digital twin archival program 132 stores any data collected and sent by IoT sensor 120 in database 134.

In decision 220, digital twin archival program 132 determines whether a threshold for decommissioning the physical asset has been met. In an embodiment, digital twin archival program 132 determines whether the threshold for decommissioning has been met by assessing the data or lack of data monitored for in step 210. If digital twin archival program 132 determines the threshold for decommissioning has been met (decision 220, YES branch), then digital twin archival program 132 moves on to step 230. If digital twin archival program 132 determines the threshold for decommissioning has not been met (decision 220, NO branch), then digital twin archival program 132 continues to monitor for data collected by IoT sensor 120 associated with the physical asset (step 210).

In an embodiment, the threshold for decommissioning is pre-configured by parties to the digital twin agreement through user interface 148. In another embodiment, digital twin archival program 132 pre-configures the threshold for decommissioning to be triggered when a length of time of usage of the physical asset defined in the digital twin agreement is reached. After the physical asset has been used for the pre-configured length of time, digital twin archival program 132 determines that the threshold for decommissioning has been met. (decision 220, YES branch). For example, digital twin archival program 132 pre-configures the threshold for decommissioning to be triggered at a length of time equal to 20 years. After the physical asset in which IoT sensor 120 is associated with is used for 20 years, digital twin archival program 132 determines that the threshold for decommissioning has been met.

In another embodiment, digital twin archival program 132 pre-configures the threshold for decommissioning to be triggered when a length of dormancy or lack of use defined in the digital twin agreement is reached. In an embodiment, the length of dormancy is pre-configured by parties to the digital twin agreement through user interface 148. If digital twin archival program 132 does not receive any data from an IoT sensor associated with the physical asset for the pre-configured length of time, then digital twin archival program 132 determines that the threshold for decommissioning has been met. (decision 220, YES branch). For example, digital twin archival program 132 pre-configures the threshold for decommissioning for a length of dormancy of one year. After the physical asset in which IoT sensor 120 is associated with is dormant and no data is collected for one year, the threshold for decommissioning is triggered.

In another embodiment, digital twin archival program 132 pre-configures the threshold for decommissioning to be triggered when a physical asset in which IoT sensor 120 is associated with is moved to a certain location. In an embodiment, the certain location is pre-configured by parties to the digital twin agreement through user interface 148. In this embodiment, digital twin archival program 132 pre-configures the threshold for decommissioning to be triggered if the physical asset in which IoT sensor 120 is associated with is moved to a known physical asset destruction facility, i.e., a junk yard. For example, if digital twin archival program 132 receives data from IoT sensor 120 that the physical asset's location has changed to a known junk yard, then digital twin archival program 132 determines that the threshold for decommissioning has been met. (decision 220, YES branch).

In another embodiment, digital twin archival program 132 pre-configures the threshold for decommissioning to be triggered when a GPS location of the physical asset in which IoT sensor 120 is associated with has not changed for a period of time. In an embodiment, the period of time is pre-configured by parties to the digital twin agreement through user interface 148. In an embodiment, if digital twin archival program 132 monitors that the GPS location of the physical asset has not moved for the threshold period of time, then digital twin archival program 132 determines that the threshold for decommissioning has been met (decision 220, YES branch).

In another embodiment, digital twin archival program 132 pre-configures the threshold for decommissioning to be triggered when a specific event associated with the physical asset in which IoT sensor 120 is associated with does not occur for a period of time never change but they're being reported. In an embodiment, the specific events and/or the period of time is pre-configured by parties to the digital twin agreement through user interface 148. For example, if the physical asset is a forklift and an IoT sensor associated with the forklift has read that the forklift has not done any lifting for over one year, then digital twin archival program 132 determines that the threshold for decommissioning has been met (decision 220, YES branch).

In step 230, digital twin archival program 132 reviews a digital twin agreement. In an embodiment, digital twin archival program 132 reviews the digital twin agreement associated with the physical asset, associated with IoT sensor 120 in which the threshold was met, formed at the time of purchase. In an embodiment, digital twin archival program 132 reviews the digital twin agreement to determine whether approval is required to archive the digital twin associated with the physical asset from a set of parties. The set of parties may include, but is not limited to a buyer, a seller, a previous owner(s), a manufacturer, a supplier of part(s), a technician(s) who performed work on the physical asset in which IoT sensor 120 is embedded, and/or other third parties.

In decision 240, digital twin archival program 132 determines whether approval is required from the set of parties. In an embodiment, digital twin archival program 132 determines whether approval is required from the set of parties based on the review of the digital twin agreement. If digital twin archival program 132 determines approval by the set of parties is required (decision 240, YES branch), then digital twin decommission and archival program 132 sends an alert to the set of parties (step 250). If digital twin archival program 132 determines approval by the set of parties is not required (decision 240, NO branch), then digital twin archival program 132 archives the digital twin associated with the physical asset (step 270).

In step 250, digital twin archival program 132 sends an alert. In an embodiment, digital twin archival program 132 sends an alert to a set of user devices associated with the set of parties required by the digital twin agreement requesting approval of the decommissioning of the physical asset and/or approval to archive the digital twin associated with the physical asset. In an embodiment, digital twin archival program 132 sends an alert to the set of parties stating that the physical asset in which IoT sensor 120 is associated with has met the threshold for decommissioning.

In decision 260, digital twin archival program 132 determines whether approval was received from the set of parties. In an embodiment, digital twin archival program 132 determines whether approval was received from the set of parties to archive the digital twin associated with the physical asset. Digital twin archival program 132 determines whether approval was received from the user device associated with each party of the set of parties.

If digital twin archival program 132 determines approval was received from the set of parties (decision 260, YES branch), then digital twin archival program 132 archives the digital twin associated with the physical asset (step 270). If digital twin archival program 132 determines approval was not received from the set of parties (decision 260, NO branch), then digital twin archival program 132 ends the process.

In step 270, digital twin archival program 132 archives the digital twin associated with the physical asset. In an embodiment, digital twin archival program 132 archives the digital twin associated with the physical asset by destroying the digital twin, by moving the digital twin to a state that is more cost effective such as off of a blockchain to a traditional storage solution, or by transferring the digital twin to a "digital twin junk yard" or to a third party that offers archival of rarely used digital twins.

In some embodiments, after the digital twin has been archived, digital twin archival program 132 receives data from IoT sensor 120 reporting usage of the physical asset. In an embodiment, digital twin archival program 132 reverses the archival of the digital twin in response to the physical asset being recommissioned.

For example, Company A purchases an underground mining truck, a physical asset. At the time of purchase, Company A agrees to and signs a digital twin agreement, effective for the next twenty years. A term of the digital twin agreement suggests that the associated digital twin be considered dormant when the physical asset does not report any IoT sensor readings for a period of one year. Thus, the threshold for decommissioning is set for a length of time equal to one year. A digital twin is created of the underground mining truck. A year passes without any IoT sensor readings. The threshold for decommissioning has been met, and so, digital twin archival program 132 then consults the digital twin agreement to determine if approval is required from a set of parties to archive the digital twin associated with the physical asset.

Approval is required so digital twin archival program 132 sends an alert to a set of user devices associated with the set of parties. In this case, the set of parties is Company A, the buyer and the manufacturer. Once approval is received from both Company A and the manufacturer, digital twin archival program 132 archives the digital twin associated with the physical asset.

In an embodiment, an entry corresponding to the decommissioning of the physical asset and the archival of the digital twin associated with the physical asset may be recorded in a blockchain ledger. In another embodiment, an entry may be made in a blockchain ledger recording a change in asset ownership, e.g., dealer ownership, purchase by customer, lease, purchase price, and lease price. In another embodiment, an entry may be made in a blockchain ledger recording asset maintenance performed, e.g., type of maintenance, labor hours, parts used, performed by, and date performed. In another embodiment, an entry may be made in a blockchain ledger recording asset criticality and reliability data, e.g., part criticality and usage rates, with input from equipment owners, third-party operators, manufacturers, dealers, etc. In another embodiment, an entry may be made in a blockchain ledger recording asset failure data, e.g., failure type, part/equipment age, failure impact, etc. In another embodiment, an entry may be made in a blockchain ledger recording warranty claim data, e.g., claim type, claimed by, claim date, etc. In another embodiment, an entry may be made in a blockchain ledger recording change history data, e.g., configuration changes, parts added/removed, etc. by the asset owner, third-party maintainer, dealer service/repair, etc. In another embodiment, an entry may be made in a blockchain ledger recording operating condition and history data of the asset, e.g., operating condition, date of reported condition, etc.

FIG. 3 depicts a block diagram of components of computer 300 executing digital twin archival program 132, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

As depicted, computer 300 includes a communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM). In general, memory 306 can include any suitable volatile or non-volatile computer-readable storage media. Cache is a fast memory that enhances the performance of computer processor(s) 304 by holding recently accessed data, and data near accessed data, from memory 306.

Digital twin archival program 132 may be stored in memory 306 and in persistent storage 308 for execution by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to IoT sensor 120, server 130 and user computing device 140. For example, I/O interface 312 may provide a connection to external devices 318 such as a keyboard, keypad, a touch screen, and/or some other suitable input device. External devices 318 may also include portable computer-readable storage media such as, for example, thumb drives, portable optical or magnetic disks, and memory cards. Software and data used to practice embodiments of the present invention may be stored on such portable computer-readable storage media and may be loaded onto the persistent storage 308 via I/O interface(s) 312. The I/O interface(s) 312 may similarly connect to a display 320.

Display 320 provides a mechanism to display data to a user and may be, for example, a computer monitor.

Programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for archiving a digital twin associated with a physical asset, the computer-implemented method comprising:
    monitoring, by one or more processors, for data sent from an Internet of Things (IoT) sensor associated with the physical asset;
    determining, by one or more processors, based on the data or lack of data received from the IoT sensor, that a pre-configured threshold, for decommissioning the physical asset and archiving the digital twin, is met;
    reviewing, by one or more processors, a digital twin agreement for the digital twin;
    determining, by one or more processors, based on the digital twin agreement, whether a set of parties of the digital twin agreement are required to approve the archival of the digital twin associated with the physical asset;
    archiving, by one or more processors, the digital twin; and
    responsive to receiving new data from the IoT sensor associated with the physical asset, in which the new data is associated with usage of the physical asset, reversing, by one or more processors, the archiving of the digital twin.

2. The computer-implemented method of claim 1, further comprising:
    determining, by one or more processors, based on the digital twin agreement, that the set of parties are required to approve the archival of the digital twin associated with the physical asset;
    sending, by one or more processors, an alert to a set of devices associated with the set of parties; and
    determining, by one or more processors, that each party of the set of parties approved the archival of the digital twin associated with the physical asset.

3. The computer-implemented method of claim 2, wherein the alert requests approval to archive the digital twin associated with the physical asset from the set of parties.

4. The computer-implemented method of claim 1, wherein the pre-configured threshold is selected from the group consisting of a length of time in which no data is read by the IoT sensor associated with the physical asset, a length of time in which a GPS position of the physical asset does not change, and a length of time in which an event associated with the physical asset is not read by the IoT sensor associated with the physical asset.

5. The computer-implemented method of claim 1, wherein archiving the digital twin comprises:
    destroying, by one or more processors, the digital twin;
    moving, by one or more processors, the digital twin to a state that is more cost effective;
    transferring, by one or more processors, the digital twin to a "digital twin" junk yard; or
    transferring, by one or more processors, the digital twin to a third party that offers archival of rarely used digital twins.

6. The computer-implemented method of claim 1, further comprising:
    recording, by one or more processors, in a blockchain ledger, an entry corresponding to decommissioning of the physical asset and archival of the digital twin associated with the physical asset; and
    recording, by one or more processors, in the blockchain ledger, a second entry corresponding to a change in ownership of the physical asset.

7. A computer program product for archiving a digital twin associated with a physical asset, the computer program product comprising:
    one or more computer-readable storage media and program instructions stored on the one or more computer-readable storage media, the program instructions comprising:
    program instructions to monitor for data sent from an Internet of Things (IoT) sensor associated with the physical asset;
    program instructions to determine based on the data or lack of data received from the IoT sensor, that a pre-configured threshold, for decommissioning the physical asset and archiving the digital twin, is met;
    program instructions to review a digital twin agreement for the digital twin;
    program instructions to determine, based on the digital twin agreement, whether a set of parties of the digital twin agreement are required to approve the archival of the digital twin associated with the physical asset;
    archiving, by one or more processors, the digital twin; and
    responsive to receiving new data from the IoT sensor associated with the physical asset, in which the new data is associated with usage of the physical asset, reversing, by one or more processors, the archiving of the digital twin.

8. The computer program product of claim 7, further comprising:
program instructions to determine, based on the digital twin agreement, that the set of parties are required to approve the archival of the digital twin associated with the physical asset;
program instructions to send an alert to a set of devices associated with the set of parties; and
program instructions to determine that each party of the set of parties approved the archival of the digital twin associated with the physical asset.

9. The computer program product of claim 8, wherein the alert requests approval to archive the digital twin associated with the physical asset from the set of parties.

10. The computer program product of claim 7, wherein the pre-configured threshold is selected from the group consisting of a length of time in which no data is read by the IoT sensor associated with the physical asset, a length of time in which a GPS position of the physical asset does not change, and a length of time in which an event associated with the physical asset is not read by the IoT sensor associated with the physical asset.

11. The computer program product of claim 7, wherein the program instructions to archive the digital twin comprise:
program instructions to destroy the digital twin;
program instructions to move the digital twin to a state that is most cost effective;
program instructions to transfer the digital twin to a digital twin junk yard; or
program instructions to transfer the digital twin to a third party that offers archival of digital twins.

12. The computer program product of claim 7, further comprising:
program instructions to record, in a blockchain ledger, an entry corresponding to decommissioning of the physical asset and archival of the digital twin associated with the physical asset; and
program instructions to record, in the blockchain ledger, a second entry corresponding to a change in ownership of the physical asset.

13. A computer system for archiving a digital twin associated with a physical asset, the computer system comprising:
one or more computer processors;
one or more computer-readable storage media;
program instructions stored on the computer-readable storage media for execution by at least one of the one or more processors, the program instructions comprising:
program instructions to monitor for data sent from an Internet of Things (IoT) sensor associated with the physical asset;
program instructions to determine based on the data or lack of data received from the IoT sensor, that a pre-configured threshold, for decommissioning the physical asset and archiving the digital twin, is met;
program instructions to review a digital twin agreement for the digital twin;
program instructions to determine, based on the digital twin agreement, whether a set of parties of the digital twin agreement are required to approve the archival of the digital twin associated with the physical asset;
archiving, by one or more processors, the digital twin; and
responsive to receiving new data from the IoT sensor associated with the physical asset, in which the new data is associated with usage of the physical asset, reversing, by one or more processors, the archiving of the digital twin.

14. The computer system of claim 13, further comprising:
program instructions to determine, based on the digital twin agreement, that the set of parties are required to approve the archival of the digital twin associated with the physical asset;
program instructions to send an alert to a set of devices associated with the set of parties; and
program instructions to determine that each party of the set of parties approved the archival of the digital twin associated with the physical asset.

15. The computer system of claim 14, wherein the alert requests approval to archive the digital twin associated with the physical asset from the set of parties.

16. The computer system of claim 13, wherein the pre-configured threshold is selected from the group consisting of a length of time in which no data is read by the IoT sensor associated with the physical asset, a length of time in which a GPS position of the physical asset does not change, and a length of time in which an event associated with the physical asset is not read by the IoT sensor associated with the physical asset.

17. The computer system of claim 13, wherein the program instructions to archive the digital twin comprise:
program instructions to destroy the digital twin;
program instructions to move the digital twin to a state that is most cost effective;
program instructions to transfer the digital twin to a digital twin junk yard; or
program instructions to transfer the digital twin to a third party that offers archival of digital twins.

\* \* \* \* \*